United States Patent
Seifert

(10) Patent No.: US 7,229,126 B2
(45) Date of Patent: Jun. 12, 2007

(54) MOTOR VEHICLE ROOF WITH TWO OPENABLE COVERS

(75) Inventor: Wolfgang Seifert, Wielenbach (DE)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 11/008,562

(22) Filed: Dec. 10, 2004

(65) Prior Publication Data

US 2005/0146164 A1   Jul. 7, 2005

(30) Foreign Application Priority Data

Dec. 10, 2003   (DE)   ................. 103 58 068

(51) Int. Cl.
   *B60J 7/047*   (2006.01)
(52) U.S. Cl. .............. 296/220.01; 296/216.03
(58) Field of Classification Search ........... 296/220.01, 296/216.03
   See application file for complete search history.

(56) References Cited

U.S. PATENT DOCUMENTS 4,786,102 A * 11/1988 Sakamoto et al. ..... 296/216.03
4,911,496 A    3/1990 Fuerst
4,978,165 A * 12/1990 Schreiter et al. ........ 296/216.03
6,457,770 B1   10/2002 Pfalzgraf et al.
6,568,750 B2    5/2003 Radmanic et al.
6,805,402 B2   10/2004 Pfalzgraf
6,942,286 B2 *  9/2005 Bohm et al. ........... 296/216.05

FOREIGN PATENT DOCUMENTS

DE   197 13 347 C1   5/1999
EP      1314600   *  5/2003   ............ 296/216.03

* cited by examiner

*Primary Examiner*—Dennis H. Pedder
(74) *Attorney, Agent, or Firm*—David S. Safran

(57) ABSTRACT

A motor vehicle roof with two openable covers (18, 20) in which the rear cover (20) can be lowered at its front edge (20V) and the front cover (18) can be moved at least partially over the rear cover (20) in its lowered position. The front cover (18) can be raised at its rear edge (18H) and by means of support devices (24) which are located near its rear edge (18H) can be moved on guides (26) which are located laterally outward alongside of the rear cover (20), which is made as a spoiler cover.

9 Claims, 8 Drawing Sheets

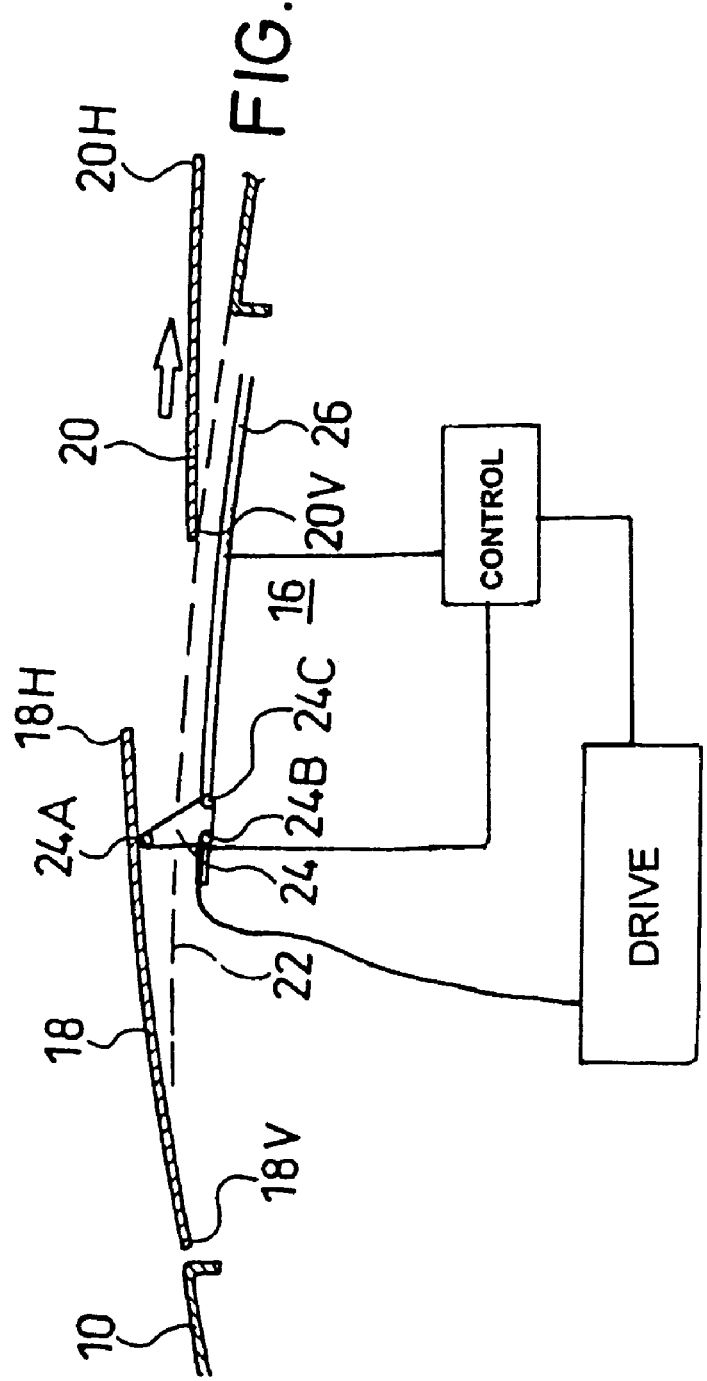

MOTOR VEHICLE ROOF WITH TWO OPENABLE COVERS

BACKGROUND OF THE INVENTION

1. Field of the Invention

The invention relates to a motor vehicle roof with two openable covers in which the rear cover can be lowered at its front edge and the front cover can be moved at least partially over the rear cover in its lowered position.

2. Description of Related Art

A motor vehicle roof of the above noted type is known from German Patent Application DE 100 13 723 A1 and corresponding U.S. Pat. No. 6,805,402. In this roof, the rear cover can be lowered on its front edge and the front cover which is made as a spoiler roof can be moved into one of several open configurations in which it extends at least partially over the lowered rear cover. The size of the maximally clearable roof opening corresponds to only a portion of the length of the front cover. The support of the front cover takes place in the manner which is typical for spoiler covers only in the front third so that the rear edge is exposed to major vibrations as a result of the wind forces which occur especially at high vehicle speeds.

Furthermore, German Patent Application DE 37 30 112 A1 and corresponding U.S. Pat. No. 4,911,496 disclose a motor vehicle roof with two covers, with a rear cover which can be completely lowered to such an extent that the front cover can be pushed to the rear over it. Ventilator positions by means of raising of the rear cover edges cannot be implemented there.

Another motor vehicle roof with two openable covers and one open configuration, in which the front cover can be moved to under the raised rear cover is known from German Patent Application DE 100 11 350 A1 and corresponding to U.S. Pat. No. 6,457,770. The open configurations there also comprise ventilator positions with raised rear cover edges. The disadvantage in this motor vehicle roof is the limited headroom, especially for the rear-seat passengers, when the front cover is lowered and pushed to the rear.

SUMMARY OF THE INVENTION

A primary object of the present invention is to devise a motor vehicle roof in which several open configurations are possible and the front cover, even in the opened state, has a stable support and the generation of wind noise is minimized.

This object is achieved by a motor vehicle roof by an arrangement in which the front cover can be raised with at rear edge, and by means of support devices which are located near its rear edge, can be moved on guides which are located alongside of the rear cover which is made as a spoiler cover.

Because the front cover is formed by an externally guided sliding roof with a side support near the rear cover edge and the rear cover is formed by a spoiler roof which can be additionally lowered at its front edge, as the open positions, one or two ventilation gaps can be set with the rear cover edges raised, a middle opening can be set when the spoiler cover has been pushed to the rear, and a large front roof opening can be set when the externally guided sliding roof has been pushed to the rear over the lowered spoiler cover. By lowering the spoiler roof at its front edge, it is possible to move the cover of the externally guided sliding roof far up the rear cover and to a large extent over it, without the front edge of the externally guided sliding roof having to be raised, as is otherwise necessary in roofs of this type. Thus, wind noise is effectively avoided in all opening positions.

According to one advantageous embodiment, the front cover and/or the rear cover can be raised individually or at the same time into a ventilator position. In this way, individual ventilation conditions can be set separately by the front and the rear seat passengers.

According to another advantageous embodiment, it is provided that the front cover has a greater length than the rear cover, and in the open position which is pushed to the rear, lies with its rear edge further rearward than the rear edge of the rear cover, so that the front cover entirely covers the rear cover in this position.

The support devices near the rear edge of the front cover are preferably guided alongside of the rear cover in guides underneath the fixed motor vehicle roof so that, with the motor vehicle roof closed, the appearance of a smooth surface is achieved. Preferably, the guides are covered by a cover which can be formed, for example, by a flexible sealing strip which can be moved to the side by the support devices when they travel into the displacement position of the front cover.

According to another advantageous option, the rear cover, with its front edge lowered, can be moved forward at least partially to under the raised front cover. In this way, a large roof opening can also be made available for the rear seat passengers.

The driving of the two covers can take place by a common electrical drive or by two separate drives, in the latter case, a common electronic control provides for the prevention of collisions of the covers by excluding degrees of freedom of motion for certain cover positions.

One embodiment of the motor vehicle roof in the invention is explained in detail below with reference to the accompanying drawings.

BRIEF DESCRIPTION OF THE DRAWINGS

FIG. 12 is a view similar to that of FIG. 4, but schematically depicting a drive and drive control for the front cover.

DETAILED DESCRIPTION OF THE INVENTION

Figure 1:
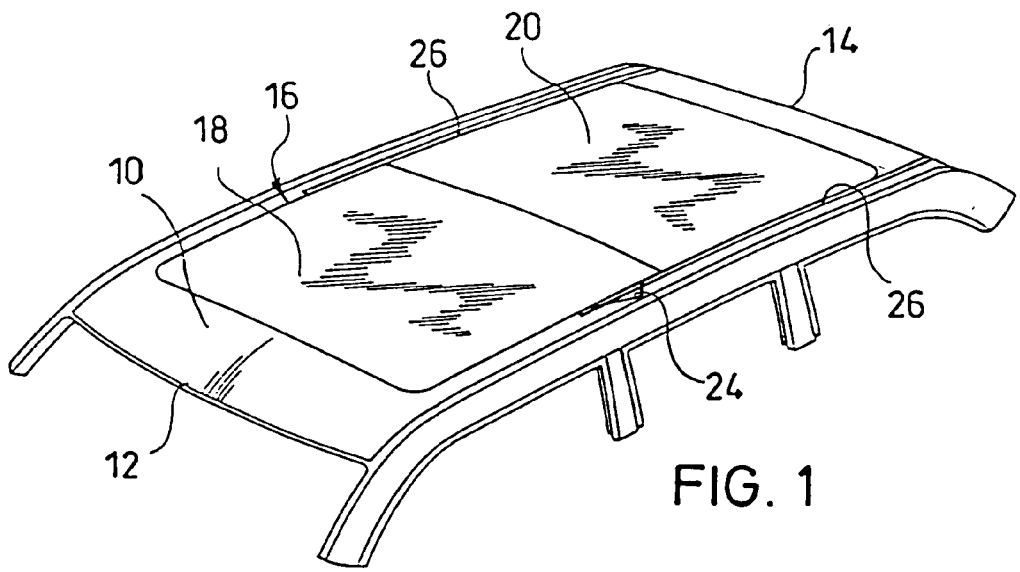
FIG. 1 shows a schematic partial perspective of a motor vehicle roof.

The motor vehicle roof 10 which is shown in FIG. 1 extends from a windshield apron 12, which is located above the front windshield, to the rear roof edge 20, which is located above the rear window (not shown). In the fixed motor vehicle roof 10, there is a roof opening 16 which can be closed by means of a front cover 18 and a rear cover 20 and which—as shown in FIGS. 2 to 5—can be at least partially cleared.

Figure 5:
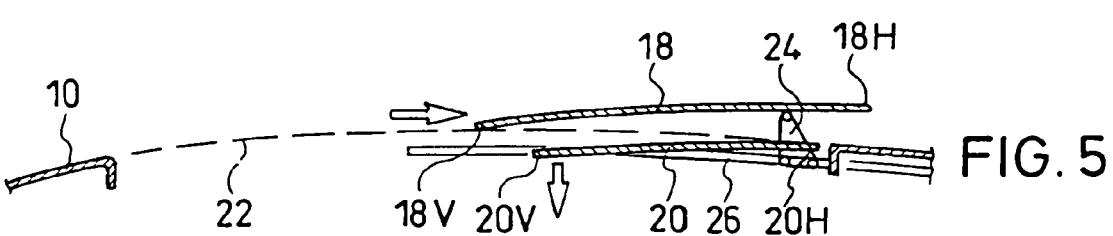
FIG. 5 shows a lengthwise section corresponding to that of FIG. 2, but with the rear cover lowered at its front edge and with the front cover pushed over it.
Figure 11:
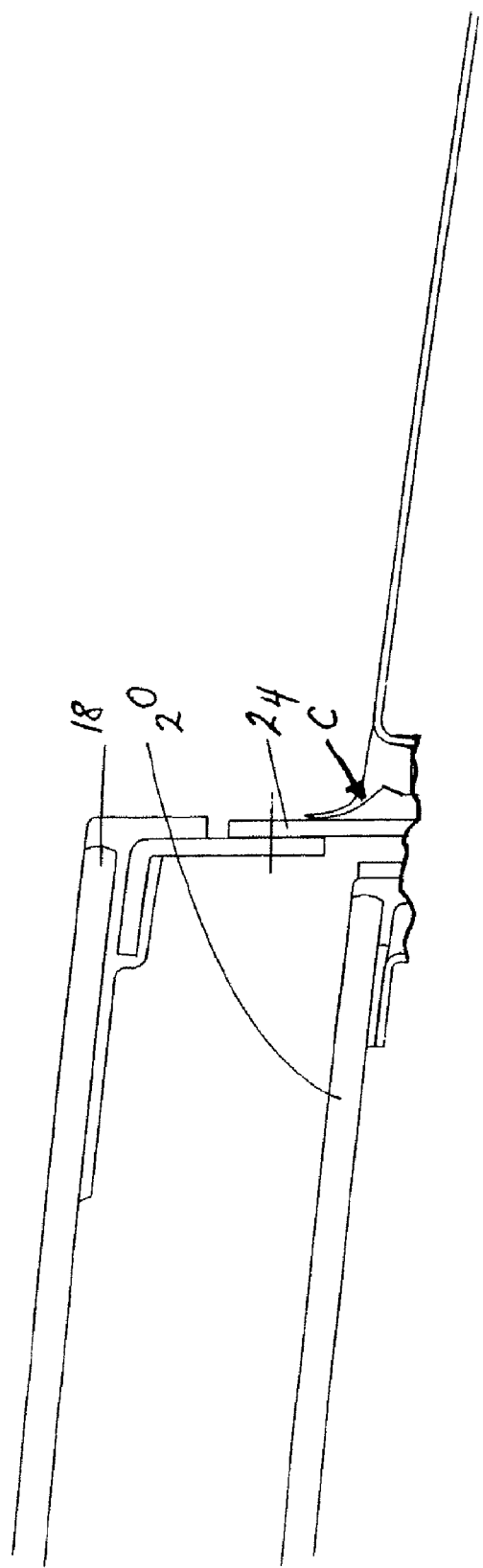
FIG. 11 is a sectional view showing a covering for the guides which is deflectable to the side by the support device for the front cover.

The front cover 18 is made in the manner of an externally guided sliding roof as is known, for example, from German Patents DE 197 13 347 C1 or DE 100 33 887 C1, and its corresponding U.S. Pat. No. 6,568,750. The cover near, its front edge 18V, is supported on the bottom by means of sliding elements (not shown) which are guided on each side of the roof opening 16 in a guide rail and near its rear edge 18H by means of triangular lever-like support devices 24 which are coupled to the top coupling point 24A near the rear edge of the front cover 18 and which are supported with sliding elements 24B, 24C in guides 26 which extend alongside of the rear cover 20 and underneath the roof contour 22 of the fixed motor vehicle roof 10. The rear sliding element 24C of the sliding elements of the support device 24 is continuously engaged to the guide 26, while the front sliding element 24B enters guide 26 only for pivoting motion out of the closed position (FIG. 2) into the raised position (FIG. 3) and stably supports the front cover 18 as it is moved to the rear (FIG. 5). Alternatively, the front end of the guide 26 can also be bent down so that the front sliding element 24B, when the front cover 18 is raised, traverses an arcuate path according to the pivoting motion. Preferably, the guides 26 are covered by a cover C which can be formed, for example, by a flexible sealing strip which can be moved to the side by the support devices 24 when they travel into the displacement position of the front cover 18 (FIG. 11).

Figure 3:
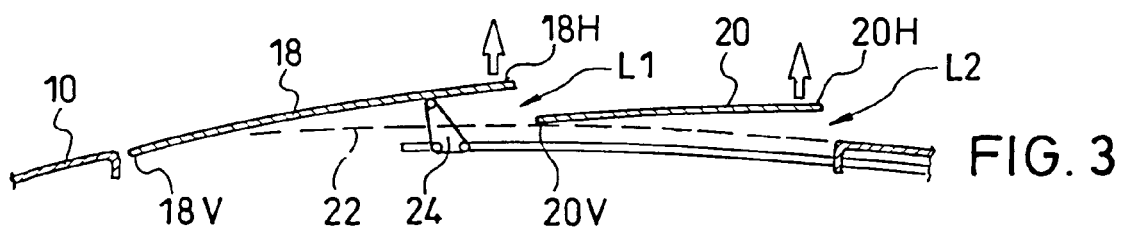
FIG. 3 shows a lengthwise section corresponding to that of FIG. 2, but with covers which have been raised into ventilation positions.
Figure 4:
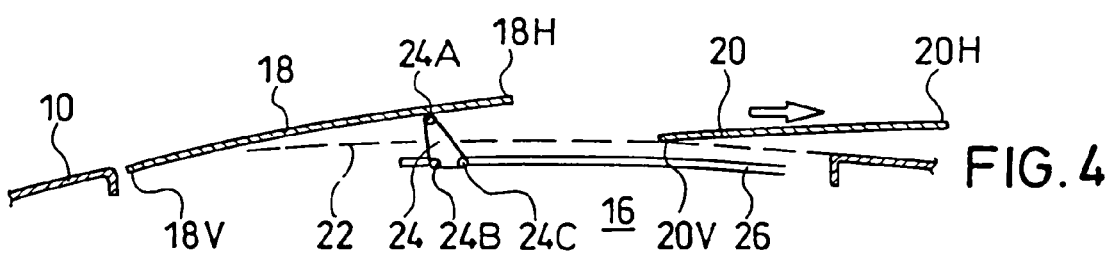
FIG. 4 shows a lengthwise section corresponding to that of FIG. 2, but with the front cover raised into the ventilation position and with the rear cover retracted.

The rear cover 20 is made in the manner of a spoiler roof so that it can be raised around a pivot axis which is located near its front edge 20V so that its rear edge 20H extends over the fixed motor vehicle roof 10 (see, FIG. 3), and in this raised position for clearance of part of the roof opening 16, can be moved to the rear over the fixed motor vehicle roof (see, FIG. 4).

However, in an expansion of the functions of a conventional spoiler roof, the rear cover 20 can be also pivot around a pivot axis which is located near its rear edge 20H, so that its front edge 20V is lowered into the roof opening 16 (see, FIG. 5). A mechanism which is suitable for this actuation of the rear cover 20 is set forth below with respect to FIGS. 6–10.

Figure 2:
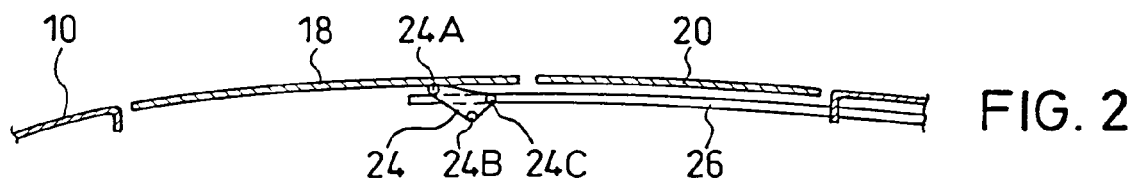
FIG. 2 shows a schematic lengthwise section through the motor vehicle roof shown in FIG. 1 in the closed state.

In the closed position as shown in FIG. 2, the front cover 18 and the rear cover 20 are located flush one behind the other and provide the motor vehicle roof 10 so as to give the appearance of a smooth surface.

Proceeding from this closed position, the front cover 18 and/or the rear cover 20 can be raised in succession or at the same time into a ventilation position, as shown in FIG. 3, a ventilation gap L1 being cleared at the rear edge 18H of the front cover 18 and a ventilation gap L2 being cleared at the rear edge 20H of the rear cover 20.

The rear cover 20 can be pushed to the rear out of this position into the open position as shown in FIG. 4, the rear edge 20H projecting rearward over the fixed motor vehicle roof 10. In this case, part of the roof opening 16 is cleared between the rear edge 18H of the front cover 18 and the front edge 20V of the rear cover 20. Proceeding from the open configuration which is shown in FIG. 3, the rear cover 20 can also optionally be pushed forward to underneath the front cover 18 in order, in this way, to clear the portion of the roof opening 16 at its rear edge 20H.

According to the open configuration shown in FIG. 5, the front cover 18, with its rear edge 18H raised, is pushed over the rear cover 20, after the front edge 20V of the rear cover 20 has been lowered.

The combination in accordance with the invention comprised of a front, externally guided sliding roof and a spoiler roof which is located behind it with a lowerable front edge enables numerous ventilation configurations, the front edge 18V of the front cover 18 always remaining at the height of the contour 22 of the motor vehicle roof 10 and thus increased wind noise, as is caused by raising the front edge in conventional externally guided sliding roofs, is avoided.

The roof system can be made as a bottom load system, the frame with the guide rails, the guide 26 and the covers 18, 20 being guided up into the roof opening from the inside of the motor vehicle roof and then being connected to the fixed motor vehicle roof. However, the roof system can also be made as a top load system, and then the guides 26 can be extended beyond the roof opening so that the upper coupling point 24A of the support devices 24 then can be located nearer the rear edge 18H of the front cover 18 and it can be pushed farther to the rear in the direction to the rear roof end 20 over the fixed motor vehicle roof 1.

Figure 6:
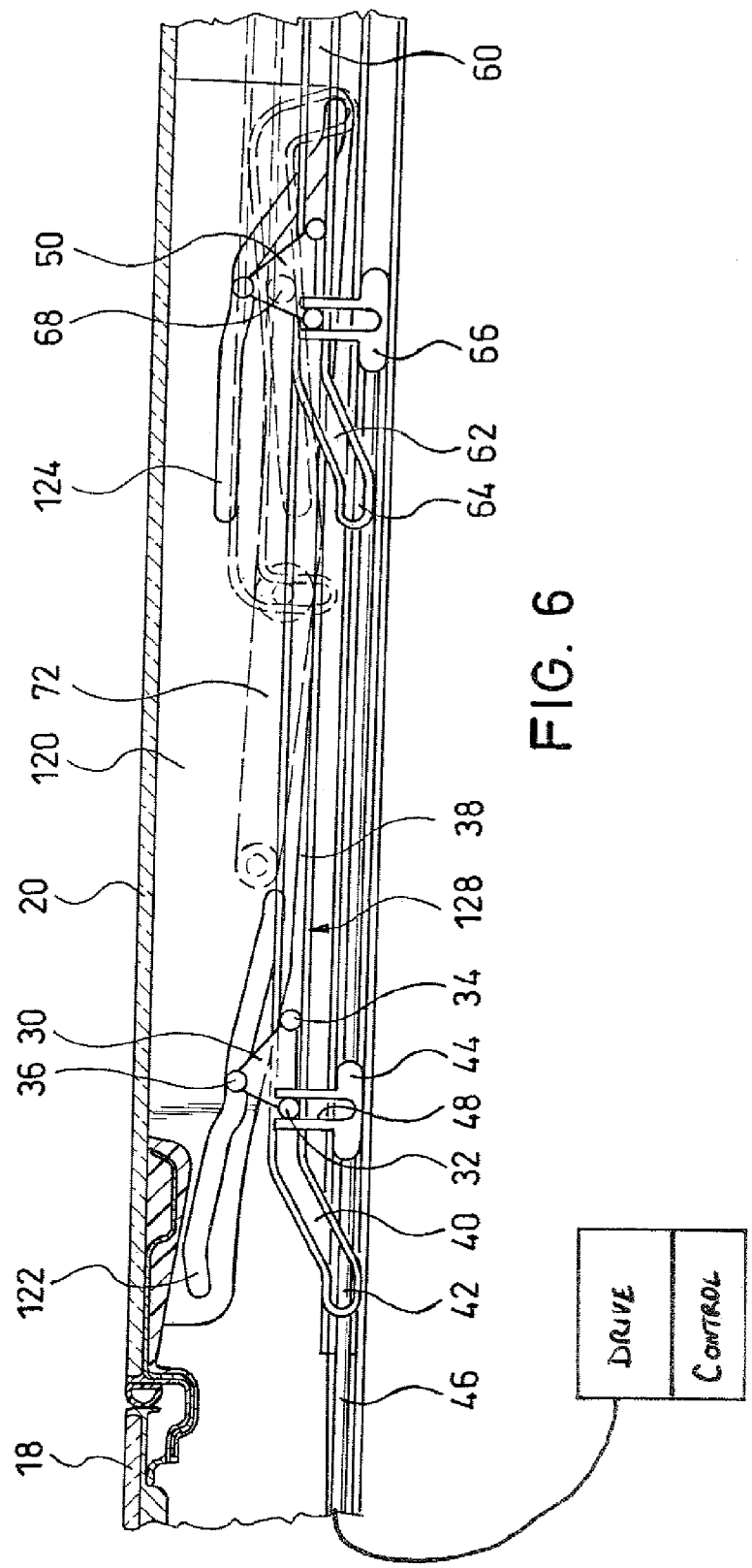
FIGS. 6–9 are views showing an embodiment of a movement mechanism for the rear cover in closed, front lowered, rear raised, and spoiler positions, respectively.

An arrangement by which the above described movements of the rear cover can be obtained will now be described. With reference to FIG. 6, a coulisse plate 120 is mounted on the bottom of the cover 20 and in the coulisse plate 120 there are a front cover guide path 122 and a rear cover guide path 124. A side roof frame carries the guide rail 26 which is provided with several guide paths. In particular, in the front area of the guide rail 26 there is a front guide path 128 in which a front triangle carriage 30 is guided with two sliders 32, 34. On its top end, the triangle carriage 30 has a third slider which is guided in the front cover guide path 122. As can be in FIG. 6, the front rail guide path 128 has a straight area 38 which runs essentially parallel to the roof surface in the lengthwise direction of the motor vehicle, and towards its front end an area 40 which runs obliquely downward toward the front. On its front end the front rail guide path 128 ends in an essentially horizontal end area 42. As can be easily appreciated from FIG. 5, movement of the front triangle carriage 30 in the lengthwise direction of the motor vehicle, as a result of the shaping of the front cover guide path 122 and the front guide rail guide path 128 leads to movement of the front part of the cover 20 up and down. To move the front triangle carriage 20, a front driver 44 is used which can be moved in the lengthwise direction of the motor vehicle by means of a drive cable 46 along a cable guideway which is provided in the guide rail 26.

Figure 7:
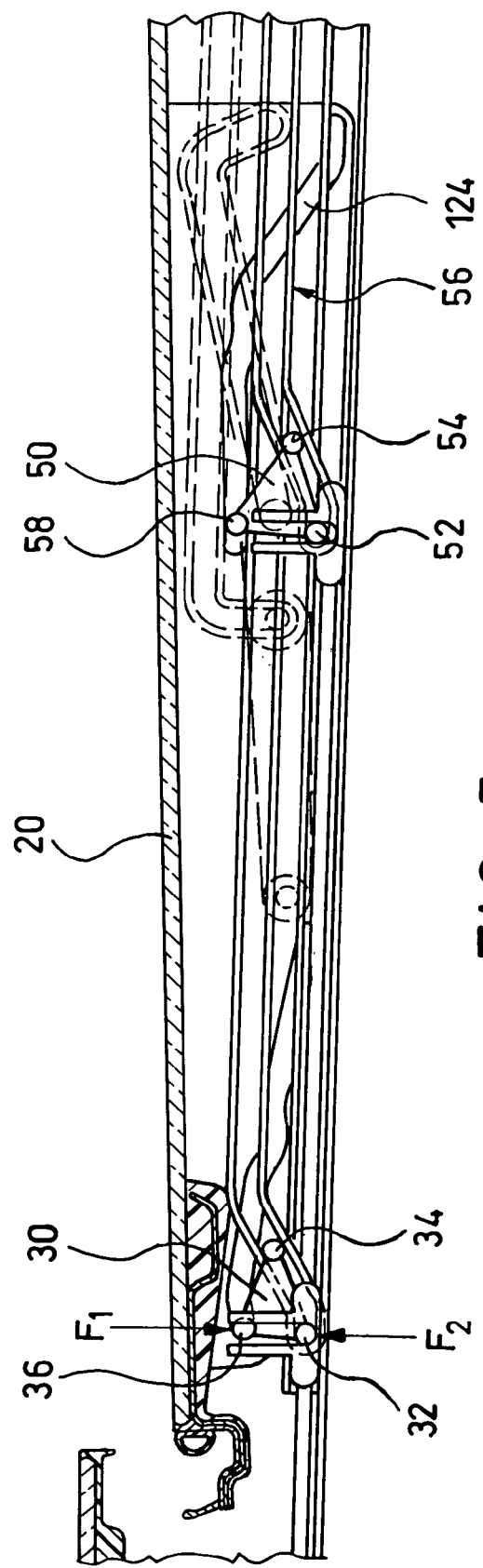

The driver 44 has a guide path 48 which runs essentially perpendicular to the direction of motion of the drive cable 46 and in which the front slider 32 of the triangle carriage 30 is guided. If the driver 44 is moved forward by means of the drive cable 46 out of the closed position shown in FIG. 6, the driver 44 displaces the front slider 32 and thus the front triangle carriage 30 forward, i.e., in the figure to the left, into the front vent position which is shown in FIG. 7. In doing so, if the carriage 30 traverses the area 40 of the front guide rail guide path 128, which area runs obliquely downward, the front slider 32 moves down in the vertical guide path 48 of the driver 44, and the triangle carriage 30 is tilted forward as it traverses the oblique area 40, i.e., in the figures, counterclockwise.

Analogously, to the front triangle carriage 30, guide paths 122, 128 and driver 44, a rear triangle carriage 50 is assigned to the cover 20 in the area farther to the rear, in this embodiment roughly in the middle of the cover 20 (see, FIG.

7), and is guided with a first slider 52 and a second slider 54 in a roof-mounted rear guide rail guide path 56, and which is guided with the third slider 58, which is located in the top area of the rear triangle carriage 50, in the cover-mounted rear cover guide path 124. Also analogously to the front guide rail guide path 128, the rear guide rail guide path 56 also has a straight area 60 which runs essentially parallel to the fixed roof surface, an area 62 which runs obliquely downward toward the front, and a front end area 64 (see, FIG. 6). The rear triangle carriage 50 is moved by means of a rear driver 66 which is mounted in the same manner as the front driver 44 on the drive cable 46. By controlling operation of the electric cover drive (represented schematically in FIG. 12) by an electronic control, collisions of the covers can be prevented by precluding certain degrees of freedom of motion for certain cover positions.

Although the structure and the function of the rear adjustment mechanism are thus analogous to those of the front adjustment mechanism, differing from the front triangle carriage 30 is the provision of an additional middle slider 68 on the rear triangle carriage 50. This slider 68 is engaged with a guide 70 which is provided in the rear area of a rocker arm 72 which is coupled on its front end by means of a bearing 74 to the coulisse plate 120 (see, FIG. 8). In the middle area of the rocker arm 72, there is another slider 76 which is guided in a roof-mounted rocker arm guide path 78.

As is especially apparent from figures, the rocker arm guide path 78 has an elongated section 80 which runs parallel to the direction of motion of the cover, and a relatively short, downwardly directed, essentially vertical section 82 on its front end. The guide path 70 which is provided in the rear area of the rocker arm 72, similarly to the rocker arm crank path 78, has a horizontal section 84 and on its back end has an essentially vertical section 86 which is extends downward.

If the cover, proceeding from the closed position shown in FIG. 6 is to be moved into the front vent position which is shown in FIG. 7, in which the front edge of the cover is lowered, by means of the drive cable 46, the drivers 44, 66 and thus the triangle carriages 30, 50 are moved forward. As can be seen in FIG. 7, the carriages 30, 50 move on the areas 40, 62 of the guide rail guide paths 28, 56, which areas are inclined downward, so that the front edge of the cover 20 is lowered. The position of the cover 20 in the lengthwise direction of the motor vehicle, i.e., in the x-direction, is ensured here in that the middle slider 76 of the rocker arm 72, over the course of the lowering motion of the front edge of the cover, remains in the vertical segment 82 of the rocker arm crank path 78. FIG. 7, furthermore, shows that in the configuration of the motor vehicle roof shown here, the triangle slider 30 assumes an ideal position in which it, with its sliders 32, 34, and 36, accommodates the forces $F_1$, $F_2$ (FIG. 7) on the sliders 36, 32 without causing a moment force.

Figure 8:
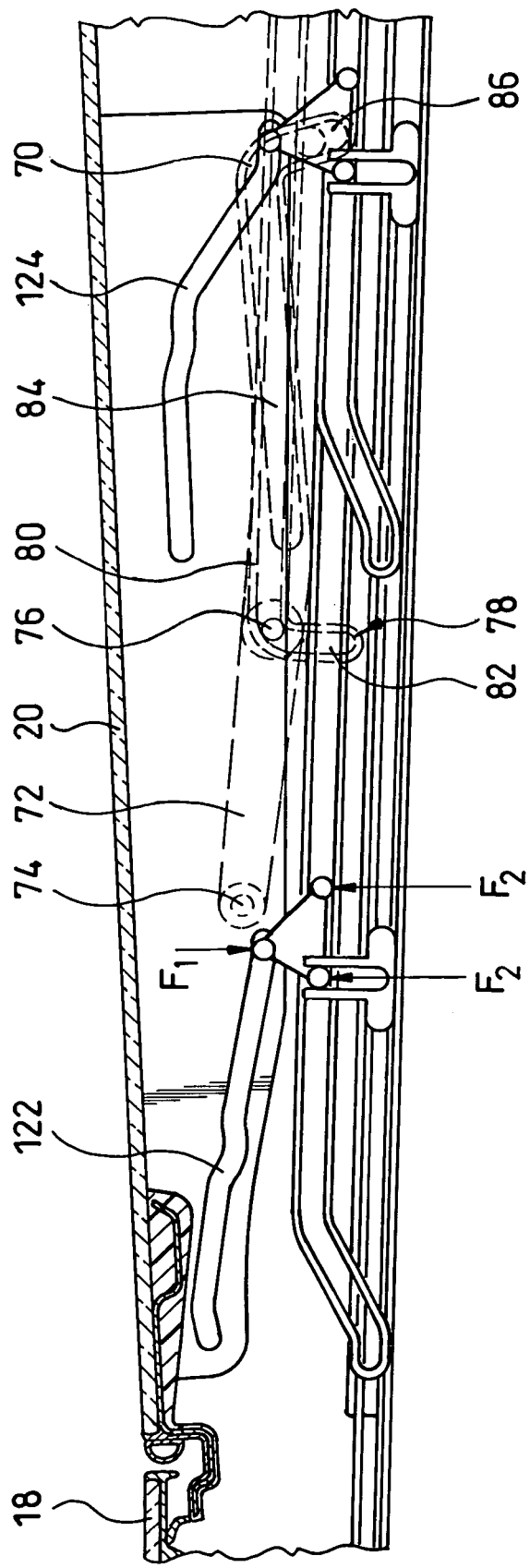

If the cover 20, proceeding from the closed position shown in FIG. 6, is to be moved into the ventilation position which is shown in FIG. 8, in which position the rear edge of the cover 20 is raised, the drivers 44, 66 and thus the carriages 30, 50 are moved to the rear via the drive cable 46. Based on the configuration of the front and rear cover guide paths 122, 124, the rear edge of the cover 20 is raised, but its front edge remains flush with the height of the fixed roof surface 10. As in the front vent position shown in FIG. 7, in the ventilation position shown in FIG. 8, the position of the cover 20 in the x direction is ensured by the rocker arm 72 which, during the movement of the cover from the closed position into the ventilation position, remains with its middle slider 76 in the vertical segment 82 of the rocker arm guide path 78. In the ventilation position shown in FIG. 8, the triangle carriage 30 with its sliders 32, 34, and 36 also ideally accommodates the forces $F_1$, $F_2$ without causing a moment force. The same also applies, of course, to the rear triangle carriage 50, both in the front ventilation position shown in FIG. 7 and also in the rear ventilation position shown in FIG. 8.

If the cover 20, proceeding from the ventilation position shown in FIG. 8 is to be moved into the open position which is shown in FIG. 4, the triangle carriages 30, 50 are moved farther to the rear by means of the drivers 44, 66 which are mounted on the drive cable 46. As can be appreciated from FIGS. 8 & 9, the location of the third sliders 36, 58 of the triangle carriages 30, 50 does not change with respect to the cover guide paths 122, 124. Rather the cover 20 undergoes only translational motion, i.e., it is pushed to the rear when the carriage moves along the straight areas 38, 60 of the guide rail guide paths 28, 56 in the inclined position according to the ventilation position of FIG. 8. Consequently, nothing changes in the distribution of the forces acting on the carriages either, i.e., the force $F_1$ acting from above as a result of the force of the weight of the cover on the carriage and the corresponding counterforces $F_2$ of the roof-mounted crank are ideally accommodated on the sliders of the triangle carriages without causing a moment forces.

Figure 9:
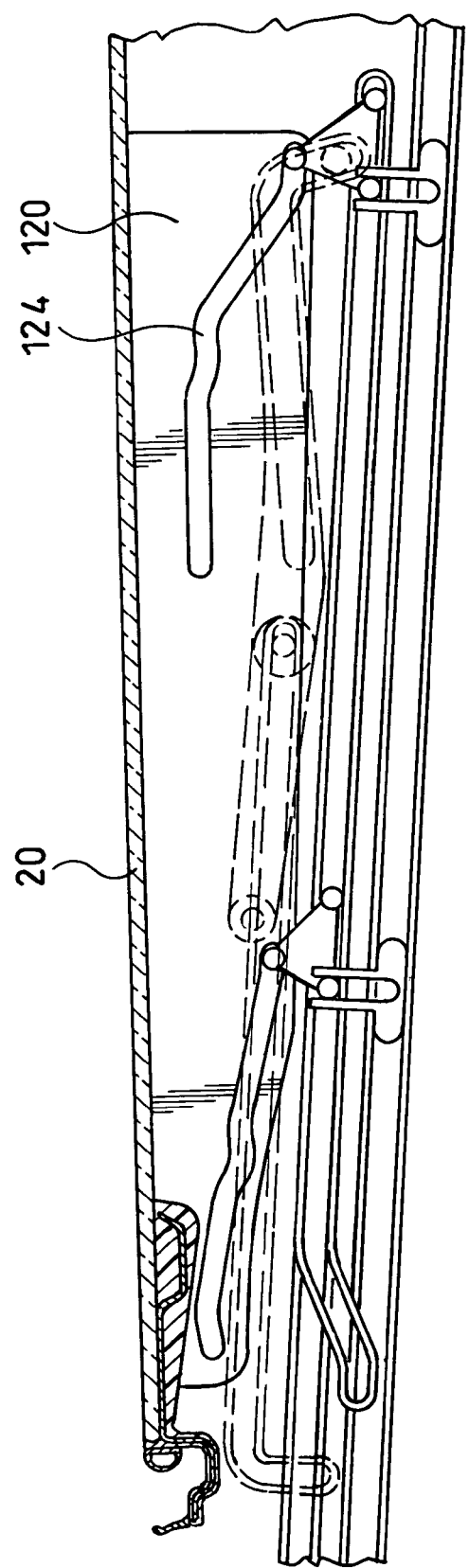
Figure 10:
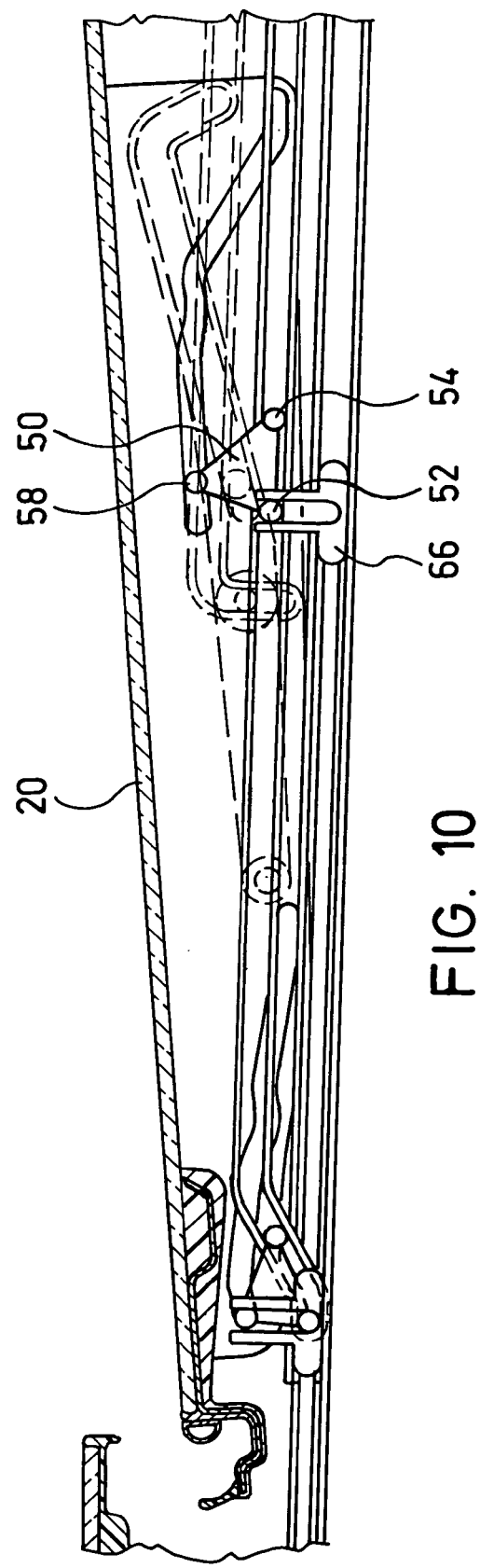
FIG. 10 shows a second embodiment of a movement mechanism for the rear cover.

FIG. 10 shows how the position of the cover can be fixed by the choice of the individual guide paths. In particular, FIG. 10 shows an alternative version of the roof in which a combined front ventilating position (as shown in FIG. 7) rear ventilating position (shown in FIG. 8) is obtainable. The embodiment shown in FIG. 10 differs from the movement mechanism as shown in FIGS. 6 to 9 in that the rear triangle carriage 50 with its first slider 52 and its second slider 54 is guided into a guide rail guide path 88 which runs straight, and which, differing from the rear guide rail guide path 56 as shown in FIGS. 6–9, does not have a front end area which runs down. All other components and their design correspond to those of FIGS. 6–9.

In the embodiment of FIG. 10, the cover 20, when the drivers 44, 65 which are attached to the drive cable 46 are moved forward, moves into a combined front and rear ventilating position in which the front edge of the cover is lowered to under the fixed roof level and at the same time the rear edge of the cover is raised to above the level of the fixed roof surface so that air can travel into the vehicle interior both through the gap which has been formed between the front and rear covers and also through the gap which has been formed between the rear cover and the rear edge of the roof opening. During the lowering of the front edge of the cover, analogously to the lowering motion which was described, in which the front triangle carriage 30 travels down in the front guide rail guide path 128, in doing so, the rear edge of the cover is raised in that the rear triangle carriage 50 in the straight guide rail guide path 88 does not undergo any downward motion and thus the cover 20 is inclined around the third slider 58 of the rear triangle carriage 50.

If the cover is moved out of the combined ventilating position which is shown in FIG. 10 into the opened position, analogous to the position shown in FIG. 9, the drivers 44, 46 are moved to the rear by means of the drive cable 46. The front triangle carriage 30 in the front guide rail guide path 122 moves up and thus raises the front edge of the cover, while the rear triangle carriage 66 with its upper third slider 58, in the rear cover guide path, executes motion essentially parallel to the top of the cover. In this way, the cover is swung back into its closed position. If the drivers 44, 66 are moved farther down, the third slider 58 of the rear triangle carriage 50 moves down in the rear cover crank path 24, by which the cover 20 with its rear edge is raised above the height of the fixed roof surface 10. If the end positions of the third sliders 36, 58 are reached in the front cover guide path 122 and the rear cover guide path 124, the cover henceforth undergoes only translational motion, i.e., it is pushed to the rear in the inclined position.

What is claimed is:

1. Motor vehicle roof with a fixed roof and openable front and rear covers which are mounted on guide tracks for sliding displacement in the longitudinal direction of the fixed roof and are connected to cover raising and lowering mechanisms with which the rear cover is selectively lowerable at a front edge thereof into a lowered position and raisable at a rear edge into a raised position and with which the front cover is raisable at a rear edge thereof, the front cover, with its rear edge raised and its front edge maintained essentially at the height of the fixed roof, being movable at least partially over the rear cover when the rear cover is in said lowered position, and wherein the front cover is supported by support devices located near a rear edge of the front cover and which are movable on guides which are located alongside of the rear cover, and wherein the rear cover is operable as a spoiler cover being rearwardly displaceable along said guide tracks to a position over the fixed roof when in said raised position.

2. Motor vehicle roof as claimed in claim 1, wherein at least one of the front cover and the rear cover are individually raisable into a ventilator position by said cover raising and lowering mechanisms.

3. Motor vehicle roof as claimed in claim 1, wherein the front cover and the rear cover are raisable at the same time into a ventilator position by said cover raising and lowering mechanisms.

4. Motor vehicle roof as claimed in claim 1, wherein the front cover, in an open position which is pushed to the rear, lies with its rear edge located rearward of a rear edge of the rear cover.

5. Motor vehicle roof as claimed in claim 4, wherein the front cover has a greater length than the rear cover.

6. Motor vehicle roof as claimed in claim 1, wherein the front cover has a greater length than the rear cover.

7. Motor vehicle roof as claimed in claim 1, wherein the guides for the support devices are located underneath the fixed vehicle roof.

8. Motor vehicle roof as claimed in claim 7, wherein the guides are covered by a covering which is deflectable to the side by the support device as it travels along the guides.

9. Motor vehicle roof as claimed in claim 1, wherein the front cover and the rear cover are actuatable by means of at least one electric drive and an electronic control which controls the at least one electric drive, the control being operable for preventing collisions of the cover by precluding certain degrees of freedom of motion for certain cover positions.

* * * * *